: US 10,109,308 B1
(45) Date of Patent: Oct. 23, 2018

(54) DATA STORAGE DEVICE USING PROGRAMMABLE DEGLITCH WINDOW TO DETECT SATURATION OF VCM CURRENT CONTROL

(71) Applicant: Western Digital Technologies, Inc., San Jose, CA (US)

(72) Inventors: Brian A. Johnson, Laguna Hills, CA (US); Jaesoo Byoun, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/933,276

(22) Filed: Mar. 22, 2018

(51) Int. Cl.
- G11B 21/00 (2006.01)
- G11B 5/596 (2006.01)
- G11B 21/10 (2006.01)
- G11B 5/54 (2006.01)

(52) U.S. Cl.
CPC ........ G11B 5/59627 (2013.01); G11B 21/106 (2013.01); *G11B 5/54* (2013.01); *G11B 5/59638* (2013.01); *G11B 5/59677* (2013.01); *G11B 5/59683* (2013.01)

(58) Field of Classification Search
None
See application file for complete search history.

(56) References Cited

U.S. PATENT DOCUMENTS

| 5,204,932 | A  | * | 4/1993  | Shinohara | G11B 5/5547 318/594 |
| 6,563,660 | B1 | * | 5/2003  | Hirano    | G11B 5/54 360/75 |
| 6,690,536 | B1 |   | 2/2004  | Ryan      |  |
| 6,757,129 | B2 | * | 6/2004  | Kuroiwa   | G11B 5/5526 318/590 |
| 6,795,268 | B1 | * | 9/2004  | Ryan      | G11B 5/5547 360/78.04 |
| 7,369,350 | B2 |   | 5/2008  | Yang      |  |
| 2002/0163753 | A1 | * | 11/2002 | Settje | G11B 5/5547 360/78.04 |
| 2003/0095354 | A1 |   | 5/2003  | Atsumi et al. |  |
| 2004/0125492 | A1 | * | 7/2004  | Hamada | G11B 5/5547 360/75 |
| 2004/0232868 | A1 |   | 11/2004 | Sawtell et al. |  |
| 2014/0021886 | A1 | * | 1/2014  | Kurosawa | H02P 25/028 318/135 |

FOREIGN PATENT DOCUMENTS

JP        60117459 A  *  6/1985  .......... G11B 21/083

* cited by examiner

*Primary Examiner* — Tan X Dinh

(57) ABSTRACT

A data storage device is disclosed comprising a voice coil motor (VCM) configured to actuate a head over a disk. The head is used to read data recorded on the disk to generate a read signal, and the read signal is processed to generate a current command signal at a servo sample rate having a servo sample interval. A current flowing through the VCM is detected, and a current error signal is generated based on a difference between the current command signal and the detected current flowing through the VCM. An analog command signal is generated based on the current error signal, and the analog command signal is applied to the VCM. A saturation in the analog command signal is detected, and a first deglitch window is generated during which the saturation detection is disabled, wherein the first deglitch window is programmed relative to the servo sample interval.

24 Claims, 6 Drawing Sheets

DATA STORAGE DEVICE USING PROGRAMMABLE DEGLITCH WINDOW TO DETECT SATURATION OF VCM CURRENT CONTROL

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The servo control circuitry may include an outer digital servo loop for processing the PES to generate a current command signal, and an inner current servo loop for generating a current control signal based on a difference between the current command signal and a detected current flowing through the voice coil. Under certain conditions, such as during a seek operation, the power driver within the current servo loop may saturate, thereby degrading the ability of the servo control circuitry from maintaining the desired closed loop response that achieves the target seek performance.

DETAILED DESCRIPTION

Figure 2A:
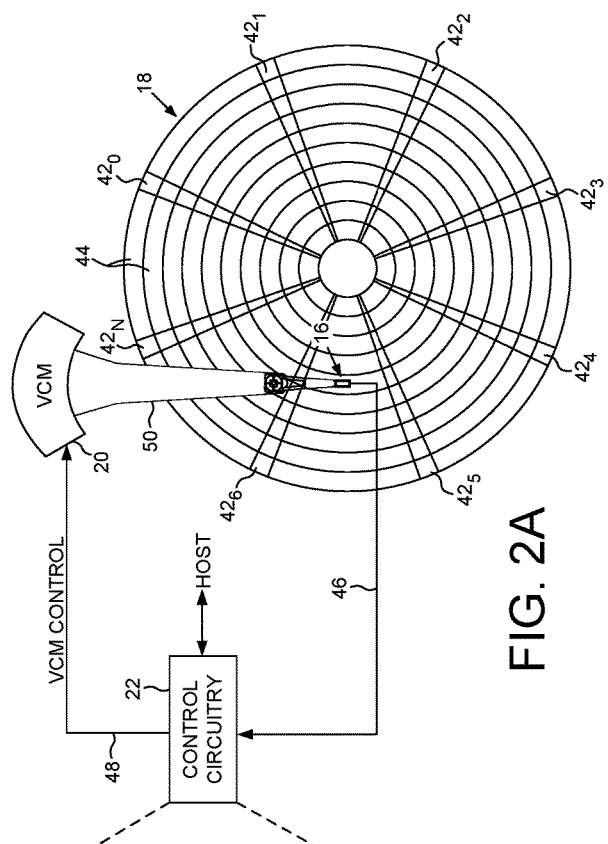
FIG. 2A shows a data storage device in the form of a disk drive according to an embodiment comprising a head actuated over a disk by a voice coil motor (VCM).
Figure 2B:
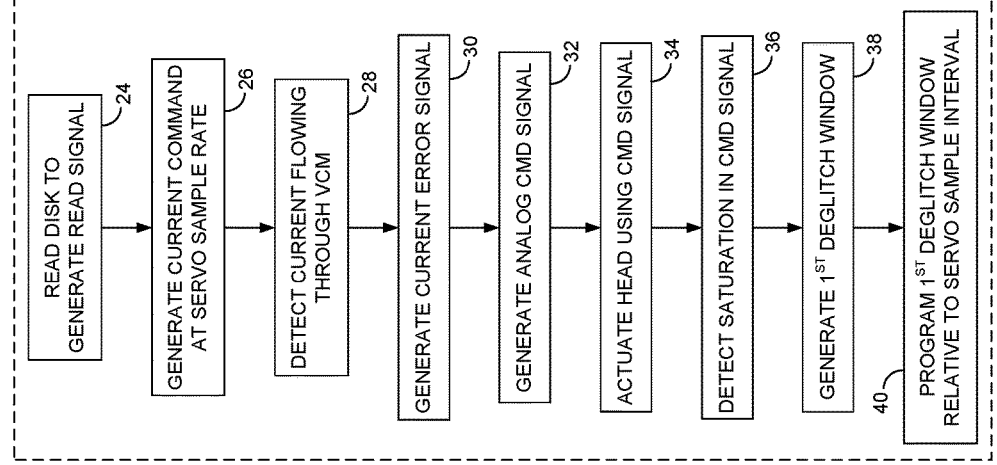
FIG. 2B is a flow diagram according to an embodiment wherein a first deglitch window is programmed relative to a servo sample rate in order to filter a saturation signal of a current servo loop.

FIG. 2A shows a data storage device in the form of a disk drive according to an embodiment comprising a head 16 actuated over a disk 18 by a voice coil motor (VCM) 20. The disk drive further comprises control circuitry 22 configured to execute the flow diagram of FIG. 2B, wherein the head is used to read data recorded on the disk to generate a read signal (block 24), and the read signal is processed to generate a current command signal at a servo sample rate having a servo sample interval (block 26). A current flowing through the VCM is detected (block 28), and a current error signal is generated based on a difference between the current command signal and the detected current flowing through the VCM (block 30). An analog command signal is generated based on the current error signal (block 32), and the analog command signal is applied to the VCM in order to actuate the VCM (block 34). A saturation in the analog command signal is detected (block 36), and a first deglitch window is generated during which the first detection is disabled (block 38), wherein the first deglitch window is programmed relative to the servo sample interval (block 40).

Figure 1:
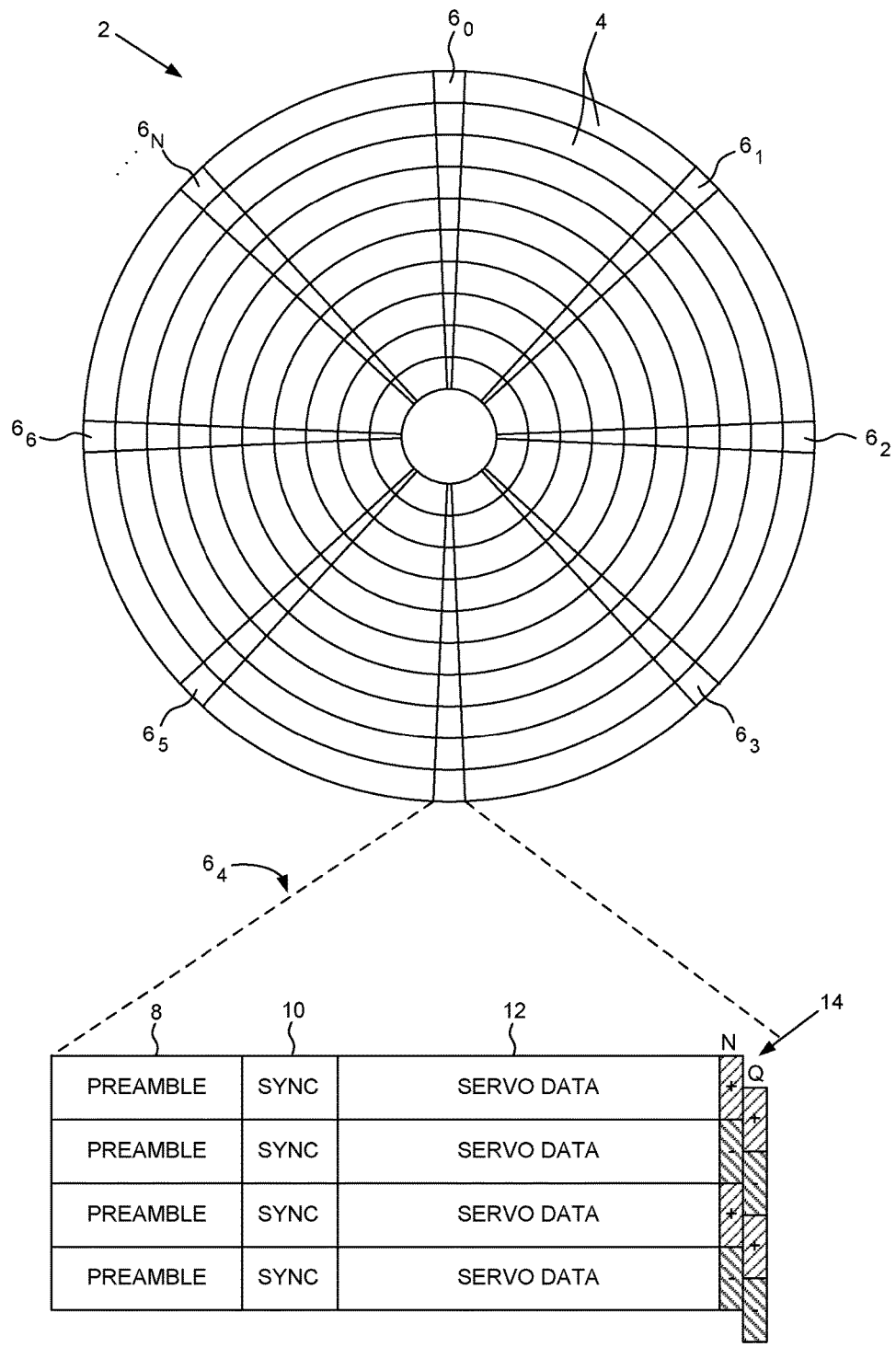
FIG. 1 shows a prior art disk format comprising a plurality of servo tracks defined by servo sectors.

In the embodiment of FIG. 2A, the disk 18 comprises a plurality of servo sectors $42_0$-$42_N$ that define a plurality of servo tracks 44, wherein data tracks are defined relative to the servo tracks at the same or different radial density. The control circuitry 22 processes a read signal 46 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 48 applied to the voice coil motor (VCM) 20 which rotates an actuator arm 50 about a pivot in order to actuate the head radially over the disk in a direction that reduces the PES. The servo sectors $42_0$-$42_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
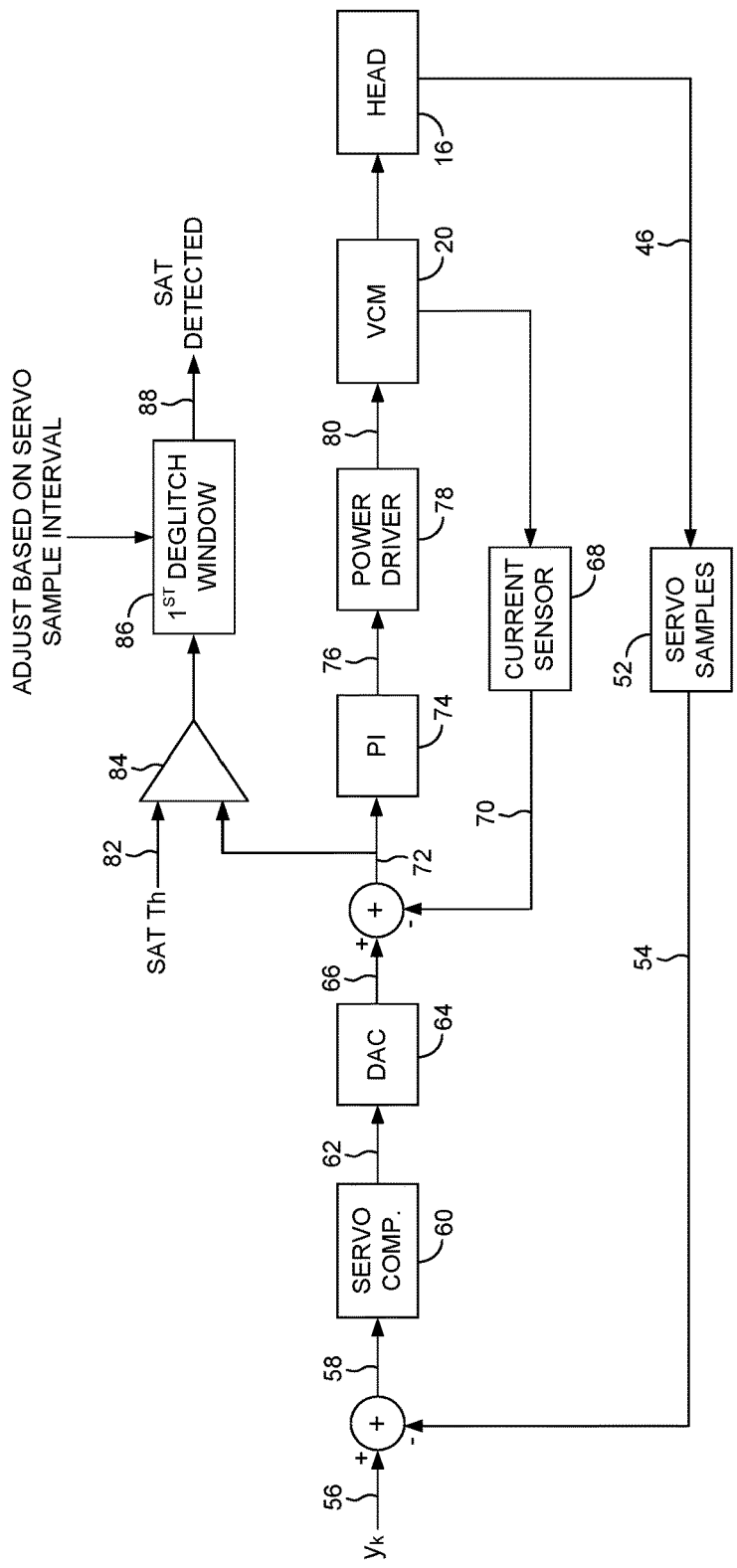
FIG. 3 shows servo control circuitry according to an embodiment comprising an outer digital servo loop and an inner current servo loop including the first deglitch window for filtering the saturation signal.

FIG. 3 shows control circuitry according to an embodiment comprising an outer digital servo loop and an inner current servo loop configured to actuate the head 16 over the disk 18. When the head 16 reads a servo sector, the read signal 46 is demodulated at block 52 to generate an estimated radial location 54 of the head. The estimated radial location 54 is subtracted from a target radial location 56 to generate a digital position error signal (PES) 58. The digital PES 58 is filtered by any suitable servo compensator 60 to generate a digital command signal 62 that is converted by a digital-to-analog converter (DAC) 64 into an analog current command signal 66. A current sensor 68 detects a current flowing through the VCM 20, and the detected current 70 is subtracted from the analog current command signal 66 to generate a current error signal 72. The current error signal 72 is processed by a suitable servo compensator 74 (e.g., a proportional-integral (PI) compensator), and the output of the servo compensator 74 is applied to a suitable power driver 78 to generate an analog command signal 80 applied to the VCM 20.

In one embodiment, there is a limit on the output range of the power driver 78 such that if the current error signal 72 exceeds a threshold the analog command signal 80 may saturate inducing a non-linear disturbance in the digital servo control loop that may degrade the desired servo performance of the head (e.g., a desired seek time). When the saturation is detected, a saturation signal notifies the control circuitry to take appropriate remedial action, such as aborting a current seek, stopping the head, and initiating a new seek operation (e.g., for the current or a different access command as determined by a rotation position optimization (RPO) algorithm). In one embodiment, a saturation in the analog command signal 80 may adversely affect the digital servo control loop if the saturation is occurring at the servo sample time (when reading a servo sector). If a saturation is occurring prior to the servo sample time but settles out prior to the servo sample time, the saturation may be ignored since it will not adversely affect the digital servo control loop. Accordingly, in one embodiment a first deglitch window is generated which disables the saturation detection during a significant part of the servo sample interval and enables the saturation detection at the servo sample time.

Figure 4:
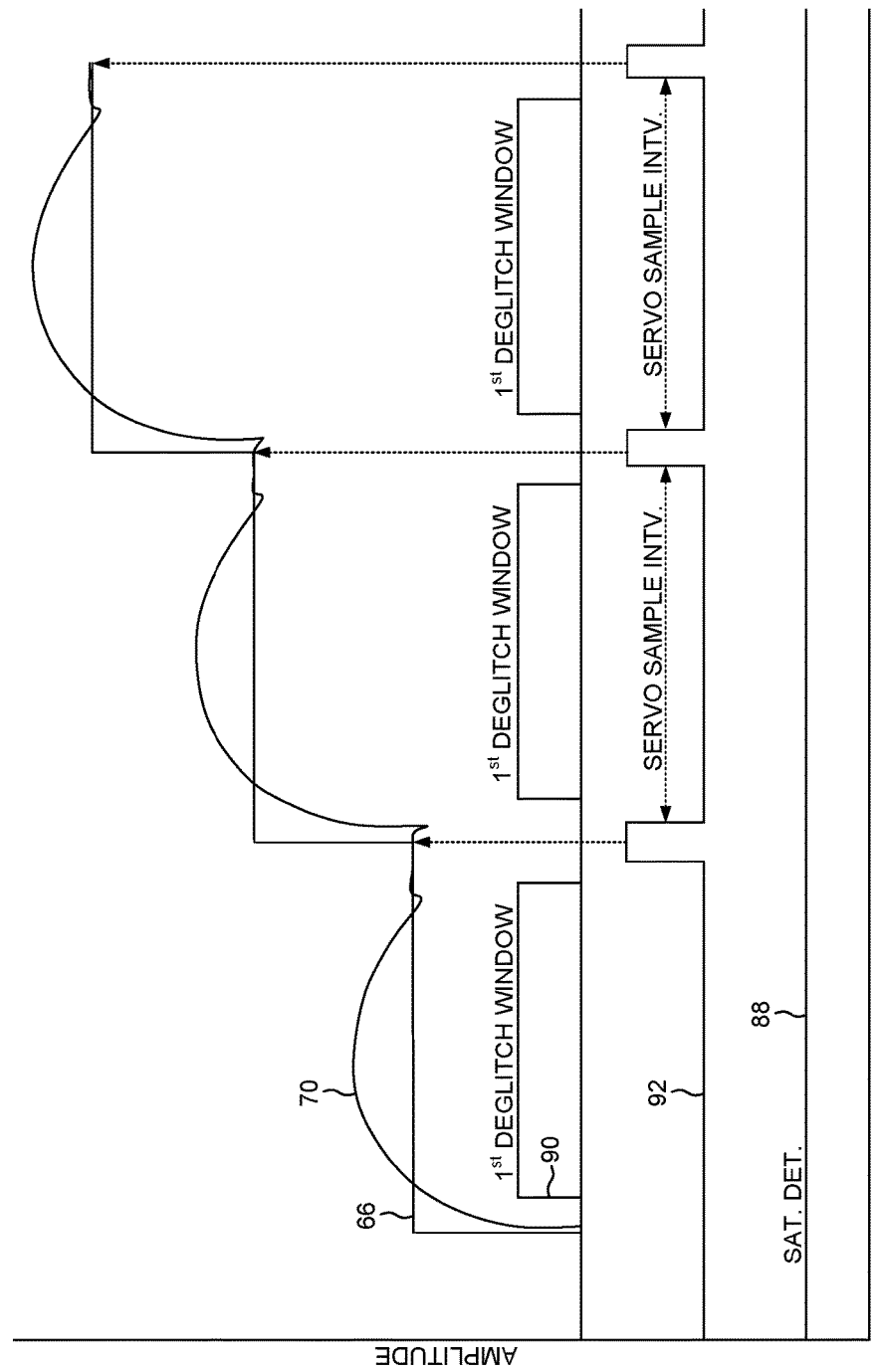
FIG. 4 shows the VCM current relative to the current command signal and a first deglitch window that disables saturation detection except during a servo sample time.

In the embodiment of FIG. 3, the saturation is detected when the current error signal 72 exceeds a threshold 82 at comparator 84. A first deglitch window block 86 disables the output of comparator 84 relative to the servo sample interval, thereby generating a filtered saturation detected signal 88. FIG. 4 illustrates an example operation of the servo control circuitry shown in FIG. 3, such as during a seek operation. Analog current command signal 66 is the signal output by the DAC 64, and the detected VCM current 70 is the signal output by the current sensor 68. Signal 90 represents the first deglitch window during which the saturation detection is disabled. Signal 92 represents the servo sample interval of the digital servo control loop, wherein signal 92 being in the high state represents the servo sample time. The filtered saturation detected signal 88 represents the output of the first deglitch window block 86 in FIG. 3. FIG. 4 illustrates that the filtered saturation detected signal 88 remains low during the first deglitch window even though a saturation may be occurring during the window. At the end of the first deglitch window the saturation has settled out, and so at the servo sample time the saturation is not detected. In one embodiment, a width of the first deglitch window may be programmed to be one percent to ten percent less than the servo sample interval. For example, the first deglitch window may be programmed to open between one percent and five percent after a beginning of the servo sample interval, and close between one percent and five percent before an end of the servo sample interval. In general, the first deglitch window may be programmed so as to suppress detection of the saturation except during the servo sample times as illustrated in FIG. 4.

In one embodiment, a width of the first deglitch window may be programmed relative to the servo sample interval for a particular family of disk drives. For example, the servo sample interval may vary across different families of disk drives due, for example, to a varying number of servo sectors recorded on the disk surface and/or due to a varying rotation speed of the disk. In another embodiment, the servo sample interval may vary within a single disk drive due, for example, to a change in rotation speed of the disk during different operating modes (e.g., a high performance mode versus a power saving mode) and/or due to a change in the number of servo sectors relative to the radial location of the head. Accordingly, in one embodiment the control circuitry may adjust a width of the first deglitch window to account for a change in the servo sample interval.

Figure 5:
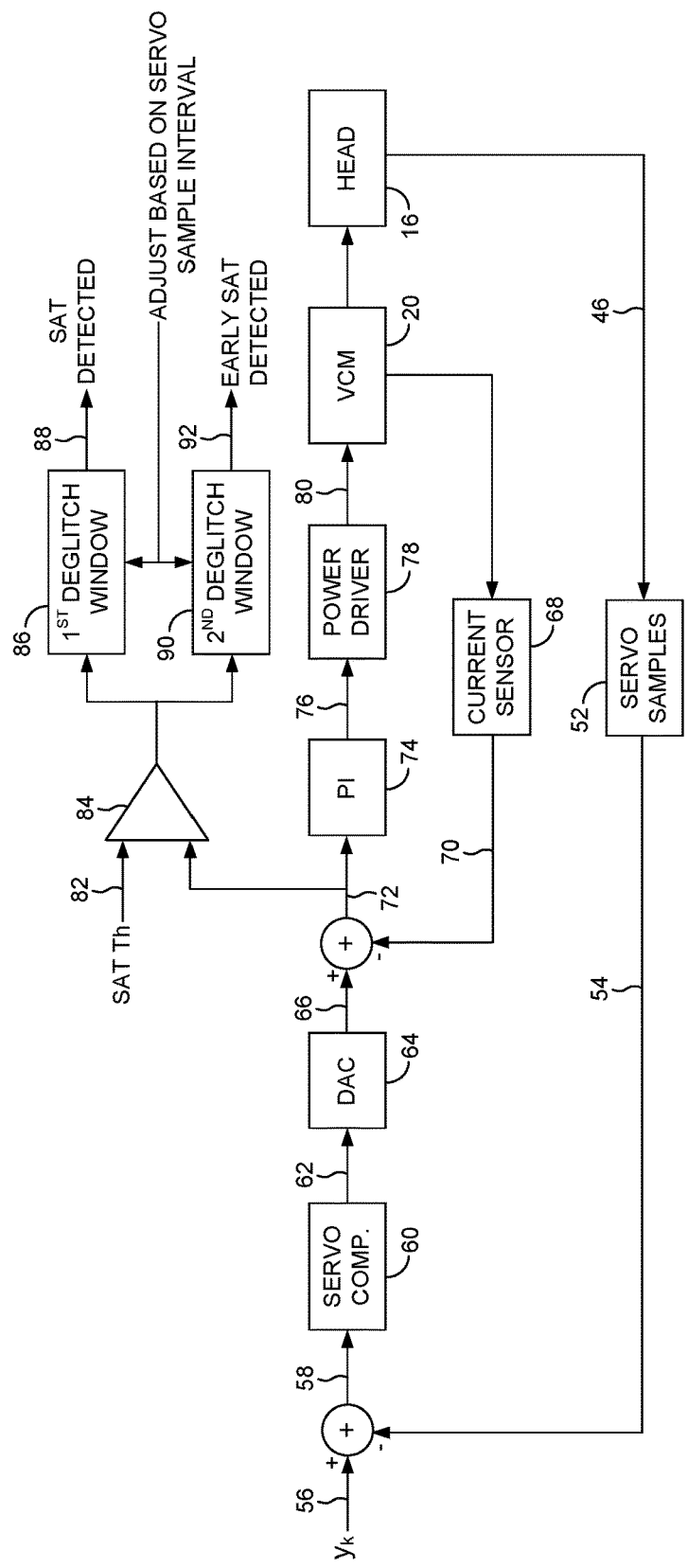
FIG. 5 shows servo control circuitry according to an embodiment comprising a second deglitch window for detecting early saturation of the current servo loop.
Figure 6:
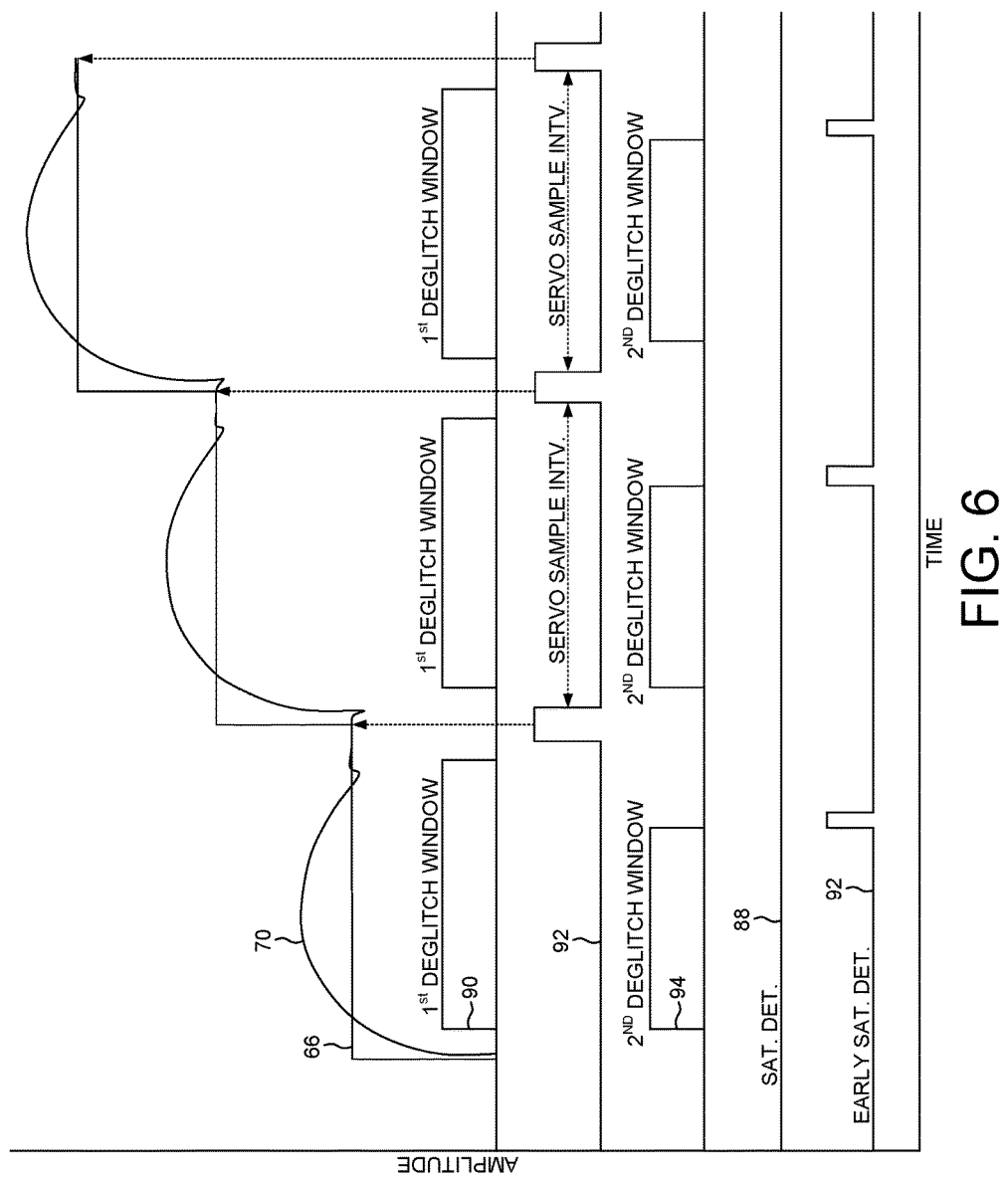
FIG. 6 shows the VCM current relative to the current command signal and an early saturation signal triggering at the end of the second deglitch window indicating the current servo loop is nearing saturation at the servo sample time.

FIG. 5 shows control circuitry according to an embodiment wherein the servo control circuitry comprises a second deglitch window block 90, wherein a width of the second deglitch window is less than a width of the first deglitch window thereby generating an early saturation detected signal 92. FIG. 6 illustrates an example operation of the servo control circuitry shown in FIG. 6, such as during a seek operation. The signals shown in FIG. 6 are the same as shown in FIG. 4 with the addition of the second deglitch window 94 and the early saturation detected signal 92 which triggers into the high state at the end of the second deglitch window to notify the control circuitry that there is a saturation occurring near the servo sample time (i.e., near the end of the first deglitch window). In the embodiment of FIG. 6, the first and second deglitch windows 90 and 94 open substantially concurrent, and the second deglitch window 94 closes sooner than the first deglitch window.

The control circuitry may take any suitable action when an early saturation is detected (i.e., when signal 92 is active high). In one embodiment, the control circuitry may process the early saturation detected signal 92 in order to calibrate the seek profile of seek operations (e.g., different length seek operations). For example, a seek profile may be adjusted until an early saturation is detected, thereby ensuring the fastest seek times while avoiding saturation at the servo sample times. In another embodiment, if an early saturation is detected during a normal seek operation, the control circuitry may adjust the corresponding seek profile so as to ensure the saturation does not occur at the servo sample times during subsequent seek operations of the same length. In one embodiment, the second deglitch window may be closed sooner when calibrating the seek profiles to ensure the early saturation is detected, and then the second deglitch window may be lengthened slightly for normal seek operations so that the seek profiles are adjusted when needed. In yet another embodiment, there may be multiple deglitch windows of varying width for detecting early saturation at different times during the servo interval so that the seek profile may be adjusted in a manner that ensures the fastest seek times while avoiding saturation at the servo sample times.

Similar to the embodiment described above, the width of the second deglitch window may be adjusted when the servo sample rate changes across different families of disk drives, or across different operating modes of a single disk drive. In one embodiment, the adjustment made to the second deglitch window may be proportional to the adjustment made to the first deglitch window.

In the embodiments described above, the saturation of the analog command signal 66 is detected when the current error signal 72 exceeds a threshold 82 at comparator 84. Other embodiments may detect the saturation by evaluating other signals in the current servo loop. For example, the saturation may be detected by evaluating the amplitude of signal 76 at the input to the power driver 78, or signal 80 output by the power driver 78. In yet another embodiment, the amplitude of the detected current 70 flowing through the VCM may be processed to detect the saturation. In still other embodiments, one or more signals within the power driver 78 may be processed to detect the saturation.

In the embodiments described above, the PES of the outer digital servo loop may be generated at the servo sample rate by reading and demodulating the servo data recorded in servo sectors. In another embodiment, the PES may be generated by reading data in addition to, or instead of, servo data recorded in servo sectors. For example, in one embodiment the PES may be generated by reading the preamble of data sectors recorded in the data tracks, wherein the preambles of adjacent data tracks may be recorded at different frequencies. In this embodiment, the PES may be generated by detecting the amplitude of the read signal at the corresponding frequencies of the adjacent preambles. Accordingly in this embodiment, the servo sample rate may be based on the linear spacing of the data sectors along the length of a data track, which in one embodiment may vary across different data zones defined over the radius of the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit and/or power circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives (disk plus solid state), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head;
   a voice coil motor (VCM) configured to actuate the head over the disk; and
   control circuitry configured to:
      use the head to read data recorded on the disk to generate a read signal;
      process the read signal to generate a current command signal at a servo sample rate having a servo sample interval;
      detect a current flowing through the VCM;
      generate a current error signal based on a difference between the current command signal and the detected current flowing through the VCM;
      generate an analog command signal based on the current error signal;
      apply the analog command signal to the VCM in order to actuate the VCM;
      detect a saturation in the analog command signal;
      generate a first deglitch window during which the saturation detection is disabled; and
      program the first deglitch window relative to the servo sample interval.

2. The data storage device as recited in claim 1, wherein the control circuitry is further configured to detect the saturation in the analog command signal by comparing the current error signal to a threshold.

3. The data storage device as recited in claim 1, wherein the control circuitry is further configured to program a width of the first deglitch window to be one percent to ten percent less than the servo sample interval.

4. The data storage device as recited in claim 3, wherein the control circuitry is further configured to program the first deglitch window to open between one percent and five percent after a beginning of the servo sample interval.

5. The data storage device as recited in claim 3, wherein the control circuitry is further configured to program the first deglitch window to close between one percent and five percent before an end of the servo sample interval.

6. The data storage device as recited in claim 1, wherein the control circuitry is further configured to adjust a width of the first deglitch window when the servo sample interval changes.

7. The data storage device as recited in claim 1, wherein the control circuitry is further configured to:

generate a second deglitch window during which the saturation detection is disabled, wherein a width of the second deglitch window is less than a width of the first deglitch window; and program the second deglitch window relative to the servo sample interval.

8. The data storage device as recited in claim 7, wherein the control circuitry is further configured to program a width of the second deglitch window to open substantially concurrent with the first deglitch window and to close sooner than the first deglitch window.

9. A method of operating a data storage device, the method comprising:

using a head to read data recorded on a disk to generate a read signal;

processing the read signal to generate a current command signal at a servo sample rate having a servo sample interval;

detecting a current flowing through a voice coil motor (VCM) configured to actuate the head over the disk;

generating a current error signal based on a difference between the current command signal and the detected current flowing through the VCM;

generating an analog command signal based on the current error signal;

applying the analog command signal to the VCM in order to actuate the VCM;

detecting a saturation in the analog command signal;

generating a first deglitch window during which the saturation detection is disabled; and programming the first deglitch window relative to the servo sample interval.

10. The method as recited in claim 9, further comprising detecting the saturation in the analog command signal by comparing the current error signal to a threshold.

11. The method as recited in claim 9, further comprising programming a width of the first deglitch window to be one percent to ten percent less than the servo sample interval.

12. The method as recited in claim 11, further comprising programming the first deglitch window to open between one percent and five percent after a beginning of the servo sample interval.

13. The method as recited in claim 11, further comprising programming the first deglitch window to close between one percent and five percent before an end of the servo sample interval.

14. The method as recited in claim 9, further comprising adjusting a width of the first deglitch window when the servo sample interval changes.

15. The method as recited in claim 9, further comprising:

generating a second deglitch window during which the saturation detection is disabled, wherein a width of the second deglitch window is less than a width of the first deglitch window; and programming the second deglitch window relative to the servo sample interval.

16. The method as recited in claim 15, further comprising programming a width of the second deglitch window to open substantially concurrent with the first deglitch window and to close sooner than the first deglitch window.

17. Control circuitry for use in a data storage device, the control circuitry configured to:

detect a current flowing through a voice coil motor (VCM) configured to actuate a head over a disk;

generate a current error signal based on a difference between a current command signal and the detected current flowing through the VCM;

generate an analog command signal based on the current error signal;

apply the analog command signal to the VCM in order to actuate the VCM;

detect a saturation in the analog command signal;

generate a first deglitch window during which the saturation detection is disabled; and receive a command to program the first deglitch window relative to a servo sample interval of a digital servo control loop configured to generate the current command signal.

18. The control circuitry as recited in claim 17, wherein the control circuitry is further configured to detect the saturation in the analog command signal by comparing the current error signal to a threshold.

19. The control circuitry as recited in claim 17, wherein the control circuitry is further configured to program a width of the first deglitch window to be one percent to ten percent less than the servo sample interval.

20. The control circuitry as recited in claim 19, wherein the control circuitry is further configured to program the first deglitch window to open between one percent and five percent after a beginning of the servo sample interval.

21. The control circuitry as recited in claim 19, wherein the control circuitry is further configured to program the first deglitch window to close between one percent and five percent before an end of the servo sample interval.

22. The control circuitry as recited in claim 17, wherein the control circuitry is further configured to adjust a width of the first deglitch window when the servo sample interval changes.

23. The control circuitry as recited in claim 17, wherein the control circuitry is further configured to:

generate a second deglitch window during which the saturation detection is disabled, wherein a width of the second deglitch window is less than a width of the first deglitch window; and receive a command to program the second deglitch window relative to the servo sample interval.

24. The control circuitry as recited in claim 23, wherein the control circuitry is further configured to program a width of the second deglitch window to open substantially concurrent with the first deglitch window and to close sooner than the first deglitch window.

* * * * *